United States Patent
Peterson (10) Patent No.: US 11,235,233 B1
(45) Date of Patent: Feb. 1, 2022

(54) AROMA GAMING SYSTEM

(71) Applicant: Richard B. Peterson, Justin, TX (US)

(72) Inventor: Richard B. Peterson, Justin, TX (US)

( * ) Notice: Subject to any disclaimer, the term of this patent is extended or adjusted under 35 U.S.C. 154(b) by 0 days.

(21) Appl. No.: 17/079,495

(22) Filed: Oct. 25, 2020

Related U.S. Application Data (60) Provisional application No. 62/925,829, filed on Oct. 25, 2019.

(51) Int. Cl.
*A63F 13/28* (2014.01)
*A63F 13/90* (2014.01)

(52) U.S. Cl.
CPC .............. *A63F 13/28* (2014.09); *A63F 13/90* (2014.09)

(58) Field of Classification Search
CPC .................................. A63F 13/28; A63F 13/90
See application file for complete search history.

(56) References Cited

U.S. PATENT DOCUMENTS

| | | | | |
|---|---|---|---|---|
| 5,949,522 A | * | 9/1999 | Manne | A63J 5/00 352/85 |
| 2005/0194460 A1 | * | 9/2005 | Selander | A61L 9/125 239/34 |
| 2011/0268605 A1 | * | 11/2011 | Haran | B05B 17/0646 422/4 |
| 2017/0274279 A1 | * | 9/2017 | Fateh | G06F 16/148 |
| 2018/0318461 A1 | * | 11/2018 | Nishimaki | A61L 9/122 |
| 2018/0373335 A1 | * | 12/2018 | Seiler | G06F 3/002 |
| 2019/0134247 A1 | * | 5/2019 | Oligie | A61L 9/122 |
| 2021/0046259 A1 | * | 2/2021 | Hasegawa | A61M 15/06 |

FOREIGN PATENT DOCUMENTS

WO    WO 2017/019630    *    2/2017    ............. A45D 34/02

* cited by examiner

*Primary Examiner* — James S. McClellan
(74) *Attorney, Agent, or Firm* — Kenneth L Tolar (57) ABSTRACT

A video game system includes a control unit and a plurality of aroma-dispensing units positioned near a gamer. The control unit includes a hollow housing containing one or more blocks with a plurality of printer-style cartridges removably positioned therein. Each cartridge contains an aromatic compound having a discrete fragrance corresponding to a game feature, such as a character or a myriad of environmental conditions. The block is in fluid communication with a plurality of dispensing units positioned near the gamer. Each dispensing unit includes a fan and a nozzle that project a discrete aromatic compound toward the gamer that is congruent with a game character or environmental condition.

10 Claims, 8 Drawing Sheets

AROMA GAMING SYSTEM

CROSS REFERENCE TO RELATED APPLICATIONS

This application claims priority of provisional application No. 62/925,829 filed on Oct. 25, 2019, the specification of which is incorporated herein by reference.

BACKGROUND OF THE INVENTION

The present invention relates to a uniquely designed video gaming system that emits discrete aromas relating to a character or environmental conditions appearing in a video game.

DESCRIPTION OF THE PRIOR ART

Video games and associated hardware peripherals are constantly evolving in an attempt to enhance the experience and further immerse the user in the virtual game environment. For example, some video games are adapted to operate with multiple video monitors so the gamer can view the game on a full screen while chatting or performing other tasks on an another monitor. Larger or high-definition screens and complex software can create a more interactive, realistic environment that immerses the player into the virtual environment.

In spite of the continuous improvements to existing gaming technology, a player only uses three senses-eyesight, hearing and cognition. Challenging only these three senses can become mundane, boring and marginally stimulating.

Accordingly, there is currently a need for an improved video game system that stimulates additional senses to create a more enhanced user experience. The present invention satisfies that need by providing a video game system that generates aromas, wind and possibly other effects corresponding to the virtual environment of the video game.

SUMMARY OF THE INVENTION

The present invention relates to a video gaming system comprising a control unit and a plurality of aroma-dispensing units positioned near a gamer. The control unit includes a hollow housing containing one or more blocks with a plurality of printer-style cartridges removably positioned therein. Each cartridge contains an aromatic compound having a discrete fragrance corresponding to a game feature, such as a character or a myriad of environmental conditions. The block is in fluid communication with a plurality of dispensing units positioned near the gamer. Each dispensing unit includes a fan and a nozzle that project a discrete aromatic compound toward the gamer that is congruent with a game character or environmental condition.

It is therefore an object of the present invention to provide a video gaming system that generates unique special effects to significantly enhance a user's experience.

It is therefore another object of the present invention to provide a video gaming system that emits various aromas congruent with a character, an environmental condition or another aspect of the game to provide a more interactive, immersive experience.

It is yet another object of the present invention to provide a video gaming system that can emit a mixture of any number of aromatic compounds to create a customized aroma.

Other objects, features, and advantages of the present invention will become readily apparent from the following detailed description of the preferred embodiment when considered with the attached drawings and the appended claims.

DESCRIPTION OF THE PREFERRED EMBODIMENT

The present invention relates to a video gaming system 100 comprising a control unit 104 and a plurality of aroma dispensing units 106 positioned near a gamer. A typical video game is played using an electronic device 102 with resident software 116, such as a computer, a laptop, a smart phone, a gaming-system controller or any similar device having a computer processor. The control unit 104 includes a hollow housing 120 having a rear wall, a plurality of sidewalls, and an open front face in communication within an interior storage compartment. A door 122 is pivotal onto and away from the front face to provide selective access to the interior chamber and to protect the internal components from dust and debris intrusion. The door can be secured in a closed position with any conventional latch mechanism. The electronic device is connected to the control unit with a USB cable 118.

A microprocessor within the housing includes software designed to interact with gaming software to operate the below-described electronic components that release aromatic compounds according to game events. Positioned within the interior chamber is a circuit board 158 having electrical connectors, internal circuitry and wiring for operating the microprocessor and other electronic components of the gaming system. Mounted on the rear wall is one or more blocks A, B with a plurality of printer-style cartridges 124 removably positioned therein. A cable 154 electrically connects each block to the circuit board 158. Each cartridge contains an aromatic compound having a discrete fragrance corresponding to a game feature, such as a character or a myriad of environmental conditions. On a rear wall of the cartridge is a socket 126 for receiving an electrical signal to disperse the aromatic compound. The cartridge contains piezoelectric crystals 130 for breaking the aromatic material into minute droplets that are more easily delivered to the dispensing units and dispersed into a gaming area. The droplets are delivered to an injection chamber 128 within the block for delivery to a downstream mixing chamber 150 described, infra. To remove a cartridge, a user lifts a flip-lock 132.

The character and environmental fragrances are unlimited and could be created to identify certain characters and features of a given game. For example, for characters in the game "Overwatch," the aromas associated with each character could be as follows:

| Character™ | Suggested Aroma with that Character |
|---|---|
| Ana | Old lady smell, Medicine → Mothballs & Alcohol |
| Ashe | fire smell, gun shot, dynamite |
| Baptiste | To be determined |
| Bastion | Hydraulic fluid, gun powder, birds, machine oil |
| Brigette | To be determined |
| D.Va | Aircraft, hydraulics, perfume |
| Doomfist | To be determined |
| Genji | Leather, steel |
| Hanzo | Leather |
| Junkrat | Explosives, B.O., Bad breath, rubber |
| Lucio | Cheerios, healing |
| McCree | Whiskey, old leather, exploding gunpowder |
| Mei | Cold, blizzard, rain |
| Mercy | To be determined |
| Moira | New nail, perfume, healing |
| Orisa | Machine, glass or plastic |
| Pharah | Perfume, exploded gunpowder, rockets |
| Reaper | Shotguns firing, death, leather |
| Reinhart | Candy, glass or plastic |
| Roadhog | Bad B.O. fish, exploded gunpowder |
| Soldier:76 | Rocket explosion, healing, gun powder |
| Sombra | Perfume, computer heat |
| Symmetra | perfume |
| Torbjorn | Machine gun firing, armor, sulfur |
| Tracer | Perfume, pine cones |
| Widowmaker | Death, perfume, exploded gunpowder |
| Winston | Gorilla, bananas, peanut butter, bad breath, glass or plastic |
| Wrecking Ball | Mechanical, muskrat, exploding gunpowder |
| Zarya | Perfume, working out B.O. |
| Zenyetta | Chestnuts, healing |

As another example, for the game "World of Warcraft," the environmental aromas could be:

| Example Environments |
|---|
| Delicatessen, Restaurant, pub |
| Barbeque restaurant, beer |
| Campfire |
| Winter, cold |
| Ocean, salty air, fish smells, Swamp odors |
| Forge, Steel, rod, fire, smoke |
| Forest, trees, grass, flowers, herbs |
| Fresh farm soil, manure, hay |
| Various other aromas too numerous to mention |

Figure 5:
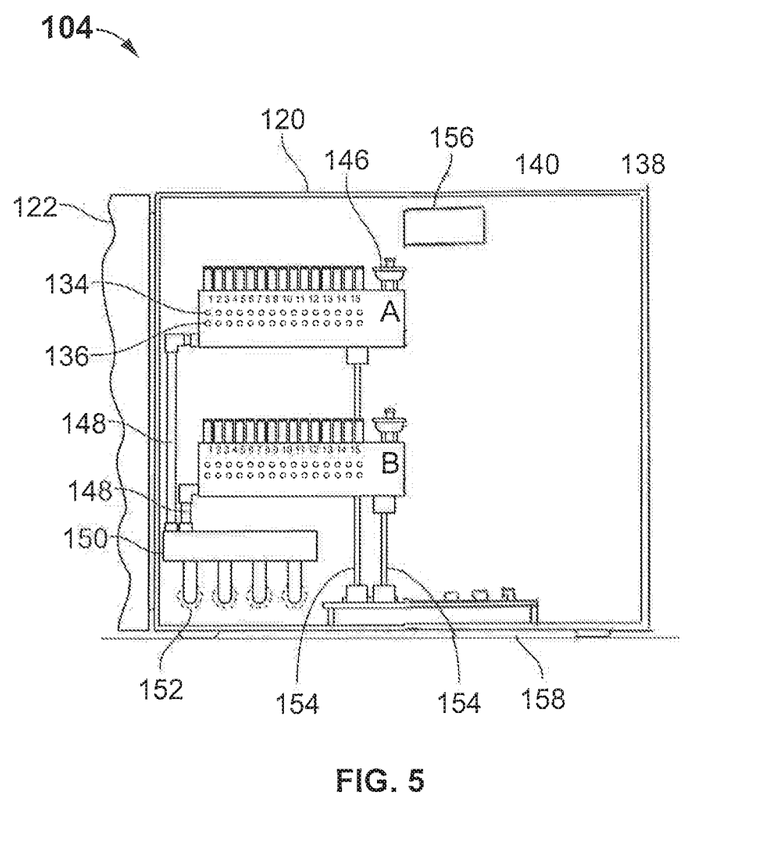
FIG. 5 is an isolated view of the housing with the access door opened to reveal the internal components.
Figure 6A:
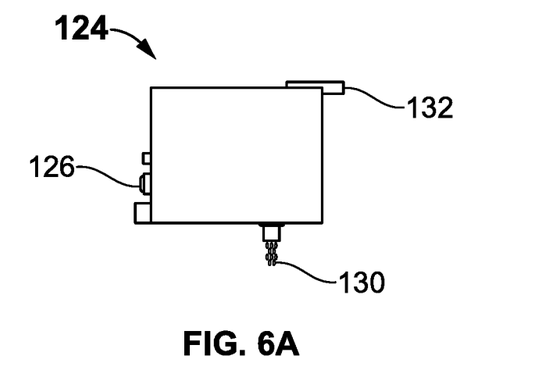
FIG. 6A is a front view of an exemplary aroma cartridge.
Figure 6B:
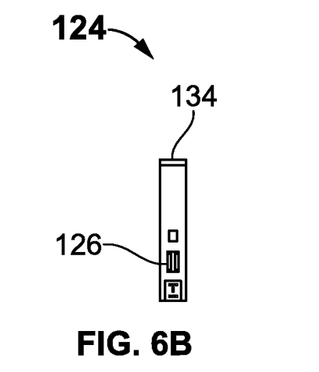
FIG. 6B is a side view of an exemplary aroma cartridge.
Figure 7:
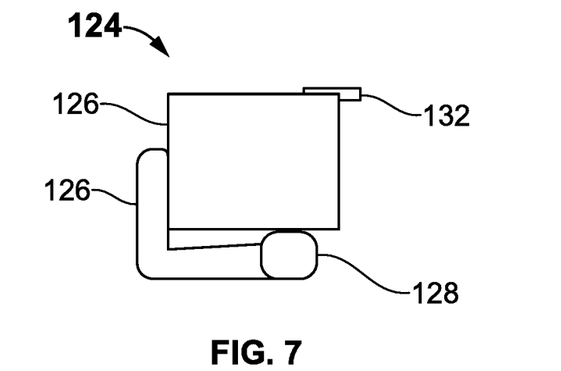
FIG. 7 is a front view of the aroma cartridge depicted in FIG. 6A installed within the housing.

A pair of LEDs are positioned on a front surface of the block, immediately beneath each cartridge. A green LED 134 illuminates if the corresponding cartridge is properly seated while a red LED 136 illuminates if the cartridge has been exhausted or is not seated correctly. An outlet tube 148 in fluid communication with each of the cartridges extends from the block to a mixing chamber 150 where the aromatic compound is vaporized and where two or more aromatic materials may be mixed, as applicable. The mixing chamber 150 includes a plurality of outlet conduits 152 connected to delivery tubes 114 extending to a designated dispensing unit for directing scented air to gamer. Each delivery tube 114 is encapsulated with a sheath 188, insulation or similar protective covering. The housing further includes a filter 156 positioned within an air intake opening on the housing rear wall. Solenoid valves 146 on an air supply line open in response to a predetermined command to deliver air to the block and provide a motive fluid for the aromatic compounds.

Figure 8:
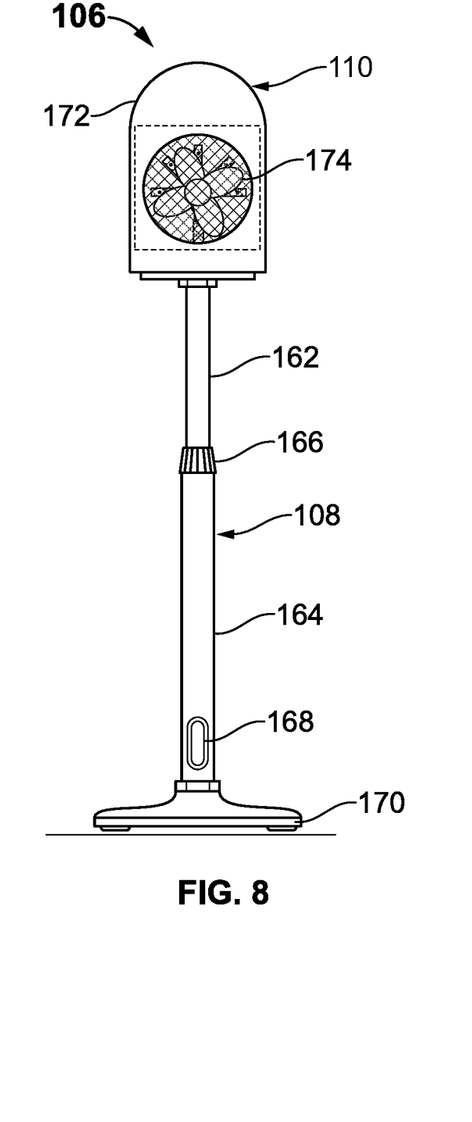
FIG. 8 is a front view of an exemplary dispensing unit.
Figure 9:
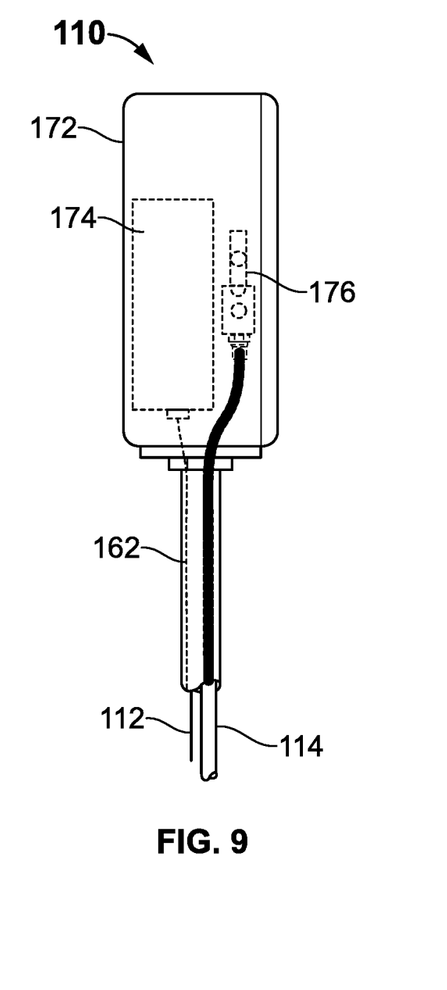
FIG. 9 is a side view of the exemplary dispensing unit of FIG. 8.
Figure 10:
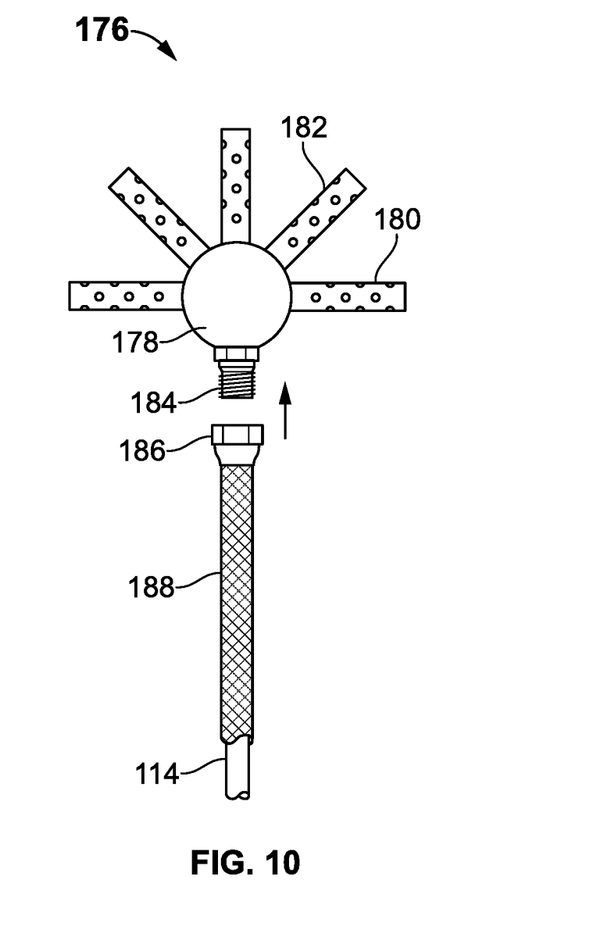
FIG. 10 is front view of an exemplary aroma dispensing nozzle.

Each dispensing unit 106 includes a pedestal 170 with a hollow support shaft 108 vertically extending therefrom. The support shaft 108 is formed of a top section 162 telescopically received within a bottom section 164. A releasable compression fitting 166 allows the shaft to be adjusted to a desired length. At the upper end of the top section is a blower 110 including a casing 172 with a fan 174 received therein. Positioned on the intake side of the fan is a dispensing nozzle 176 including a hub 178 with a plurality of tubes 180 radially extending therefrom. Each tube includes a plurality of apertures 182 that release an aromatic compound to the fan 174 for dispersal to the atmosphere. An opening 168 on the bottom shaft section 164 accommodates the delivery tube 114 and an electrical cable 112 that powers the fan. Depending from a lower surface of the hub is a threaded fitting 184 that couples with threaded collar 186 at a distal end of the delivery tube 114.

Figure 1:
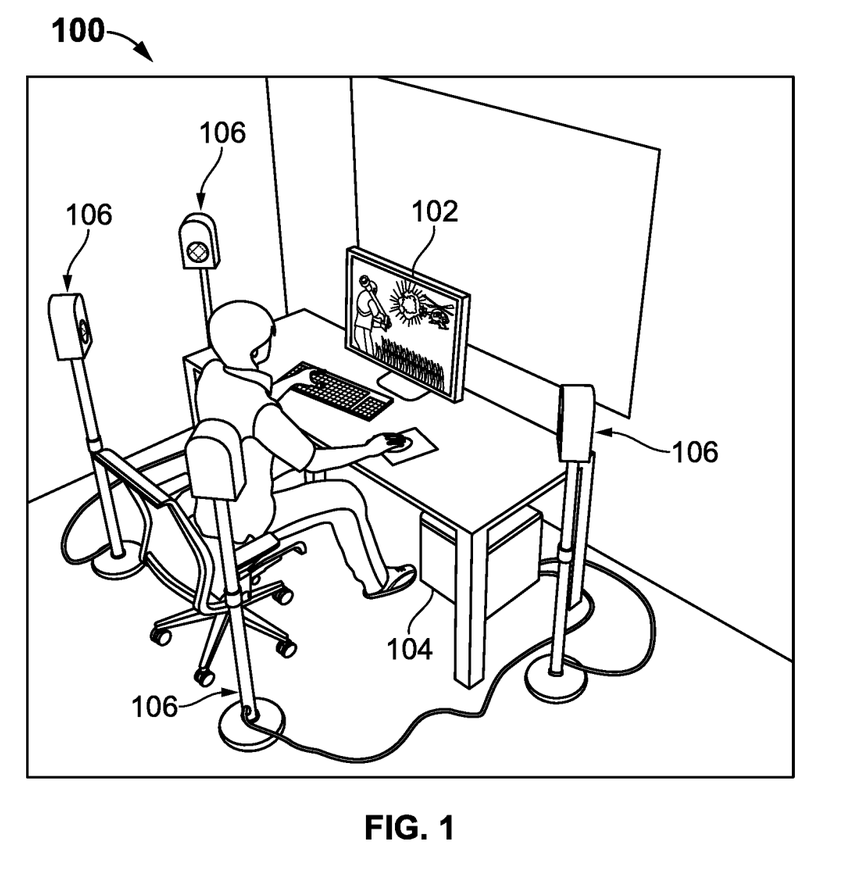
FIG. 1 depicts the gaming system according to the present invention installed in a user location.
Figure 2:
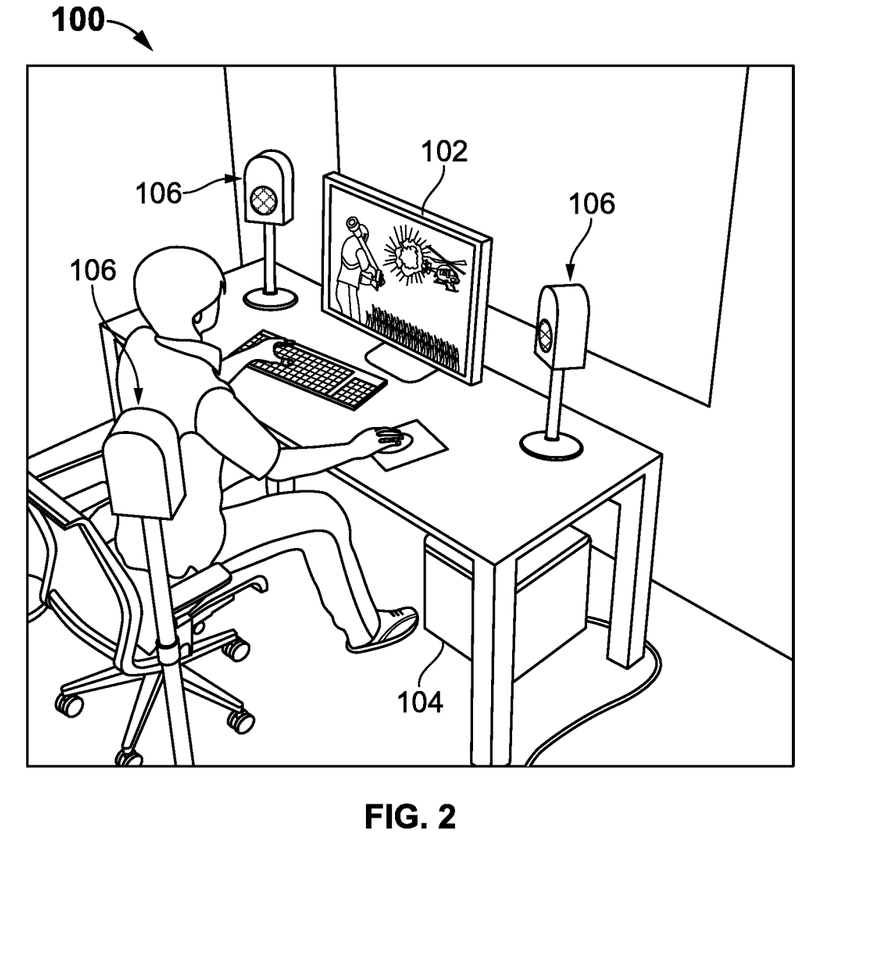
FIG. 2 depicts the gaming system of FIG. 1 with the aroma dispensing units adjusted and repositioned to create a different experience.
Figure 3:
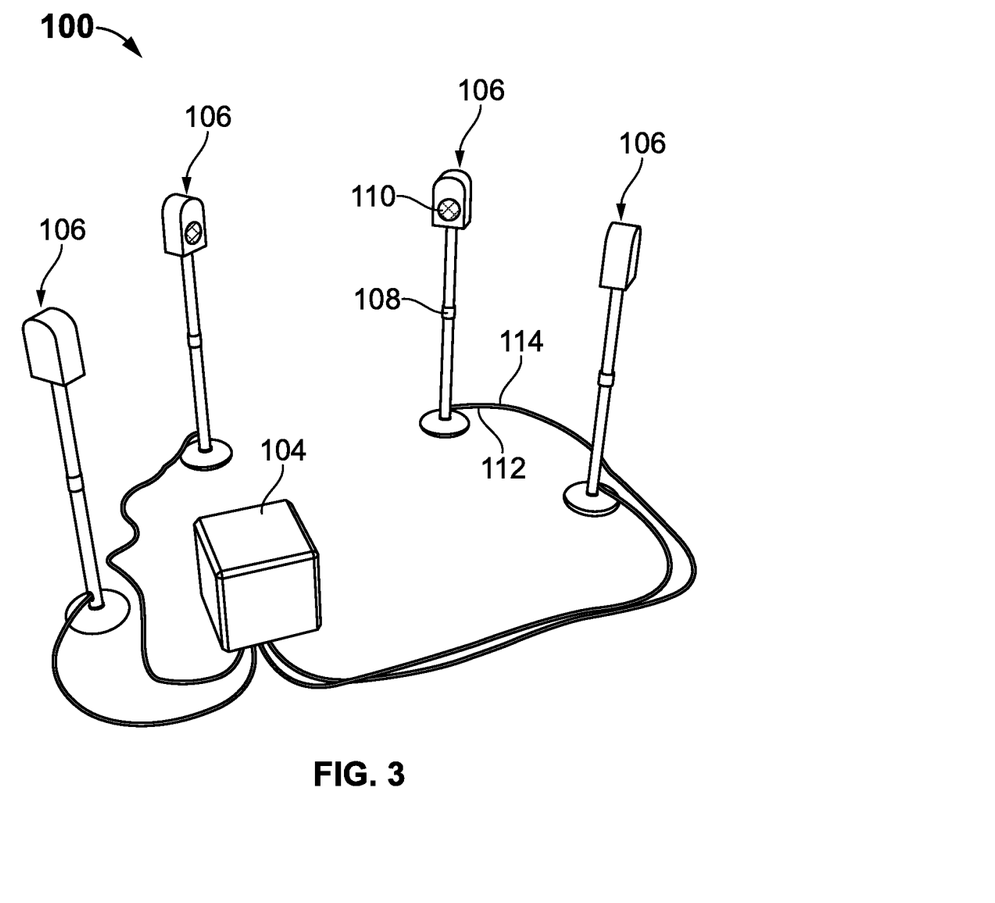
FIG. 3 is an isolated view of the gaming system.
Figure 4:
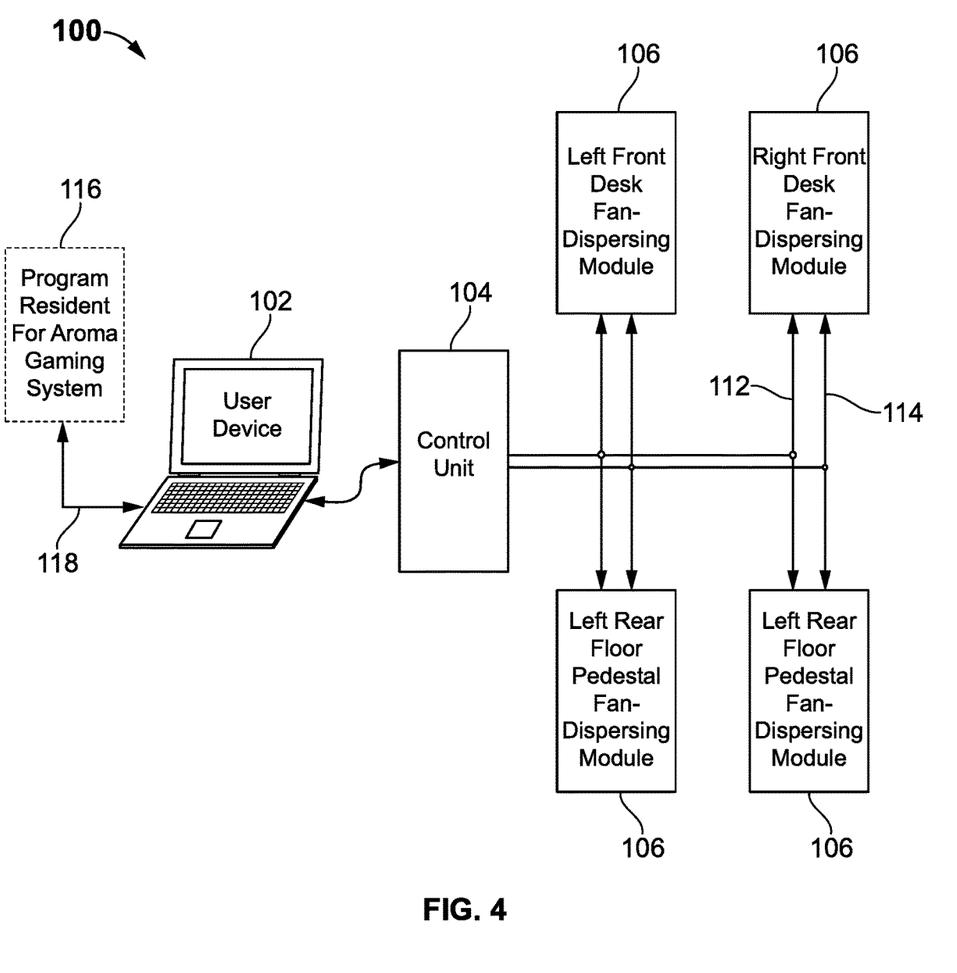
FIG. 4 is a block diagram of the gaming system.

The dispensing units can be positioned, adjusted, and independently controlled to create desired special effects. As depicted in FIG. 1, a plurality of units can be positioned on a floor surrounding a seated gamer, with some behind the gamer and the others in front. The support shafts are adjusted to suspend the fans at head level. Alternatively, a number of dispensing units can be positioned on a desk, at head level facing the gamer, with others positioned on the floor, behind the gamer as depicted in FIG. 2.

The software can be configured to engage any number of fans to simulate given conditions. For example, only the left, front fan could be engaged to simulate wind coming from the same direction. The wind sensation can be created with or without aroma, as desired. When the system is dispensing an aromatic, preferably all fans are engaged to provide the strongest sensation possible while purging residual compounds from the mixing chamber, delivery tubes, valves and dispensing units.

The above-described device is not limited to the exact details of construction and enumeration of parts provided herein. For example, though the device has been primarily depicted and described as dispersing aromas associated with environmental characters or simulating wind, it could also be equipped with liquid CO2 or any other similar refrigerant to simulate cold or frigid environments. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A gaming system comprising:
   a control unit connected to an electronic device, said control unit formed of a housing having a plurality of cartridges mounted therein, each of said cartridges having an aromatic compound with a discrete fragrance that is congruent with a character or environmental condition of a predetermined video game;
   a plurality of portable, remote dispensing units in fluid communication with said plurality of cartridges, said portable dispensing units positionable in select locations near a user;

a nozzle on said dispensing unit;

a fan within said dispensing unit for dispersing said aromatic compound to a gaming area.

2. The gaming system according to claim 1 wherein said cartridges are positioned within a block received within said housing.

3. The gaming system according to claim 2 further comprising a pair of LEDs positioned on said block, a first of said LEDs illuminating in a first color if one of said cartridges is properly seated while a second of said LEDs illuminates in a second color if the one of said cartridges has been exhausted.

4. The gaming system according to claim 1 wherein each of said cartridges contains piezoelectric crystals for breaking the aromatic compound into minute droplets to facilitate dispersal to the gaming area.

5. The gaming system according to claim 1 further comprising a mixing chamber within said housing and in fluid communication with said cartridges where said aromatic compound is vaporized to facilitate dispersal to the gaming area and where two or more compounds can be mixed.

6. The gaming system according to claim 1 wherein each of said dispensing units comprise:

a hollow, length-adjustable support shaft;

a casing at an upper of said support shaft, said casing having said fan and said nozzle therein.

7. The gaming system according to claim 6 wherein said nozzle comprises a hub with a plurality of perforated tubes radially extending therefrom, said tubes in fluid communication with said cartridges.

8. The gaming system according to claim 1 further comprising a means for automatically dispersing a select one of said aromatic compounds that is congruent with the character or the environmental condition appearing in the predetermined video game.

9. The gaming system according to claim 1 further comprising a microprocessor within said housing that interacts with gaming software on said electronic device to release the aromatic compounds according to game events.

10. The gaming system according to claim 1 wherein said dispensing units are independently controllable.

\* \* \* \* \*